United States Patent
Leczkowski

[15] 3,687,029
[45] Aug. 29, 1972

[54] METHOD FOR AUTOMATIC EXPOSURE CONTROL FOR PHOTOGRAPHS WITH FLASH AND MIXED LIGHT AND CAMERA ARRANGEMENT FOR SUCH METHOD

[72] Inventor: Kurt Leczkowski, Ungererstrasse 66, 8000 Munich 23, Germany

[22] Filed: Dec. 26, 1968

[21] Appl. No.: 786,913

[30] Foreign Application Priority Data

Sept. 30, 1968 Germany..........P 17 97 468.4

[52] U.S. Cl. ...................95/10 CT, 95/11, 95/11.5, 95/53 EB, 95/64 A, 95/64 C
[51] Int. Cl. .......G03b 7/08, G03b 7/16, G03b 15/04
[58] Field of Search....95/10 C, 11, 11.5, 64 A, 64 B, 95/64 C, 53 R, 53 E, 53 EA, 53 EB

[56] References Cited

UNITED STATES PATENTS

| | | | |
|---|---|---|---|
| 3,460,451 | 8/1969 | Starp et al. | 95/10 C |
| 3,504,602 | 4/1970 | Kiper et al. | 95/10 C |
| 3,505,938 | 4/1970 | Zobel et al. | 95/10 C |

*Primary Examiner*—Joseph F. Peters, Jr.
*Attorney*—Sparrow and Sparrow

[57] ABSTRACT

Methods and corresponding arrangements for providing photographic exposures at flash and mixed light (simultaneous influence of daylight and flash conditions). The background illumination by daylight and the foreground brightness through the flash are both properly set for the photographic exposure to save the user of the camera the need to study tables or schedules. The physical and photo-technical requirements for flash and mixed light exposures vary with the given embodiments.

28 Claims, 15 Drawing Figures

Patented Aug. 29, 1972

INVENTOR:
KURT LECZKOWSKI

By Sparrow and Sparrow

Attorneys

Patented Aug. 29, 1972 3,687,029

INVENTOR:
Kurt Leczkowski

By Sparrow and Sparrow
Attorneys

INVENTOR:
Kurt Leczkowski
By
Sparrow and Sparrow
Attorneys

METHOD FOR AUTOMATIC EXPOSURE CONTROL FOR PHOTOGRAPHS WITH FLASH AND MIXED LIGHT AND CAMERA ARRANGEMENT FOR SUCH METHOD

BACKGROUND OF THE INVENTION

For photographs with daylight as well as for flash use, different automatic exposure adjustment systems are well known. But these lack an automatic adjustment for exposure with mixed light consisting of daylight with additional flash as is often required, for example, when a photographer wants to bring an important background into equal clarity with an individual or group in the foreground. The otherwise unavoidable difference in the exposure conditions of fore- and background, as known, can be equalized by addition of a flash. For such exposures with mixed light there has been, until now, no adequate automatic control available. The user is required to rely upon awkward means (such as indexes, etc.) and time-consuming procedures.

The purpose of the present invention is to remedy this deficiency with a camera which is able at any time to take pictures with normal daylight or a flash, but also pictures using a combination of both.

At each mixed light exposure the problems originate mainly in setting the flash. The user cannot change the daylight brightness, but he can graduate the brightness or the volume of the flash. Also the distance of the object from the camera (foreground distance) has a much greater significance with flash exposures than with daylight exposures. For these reasons, it is most important to solve the problem of finding automatic exposure systems or arrangements which are serviceable for flash as well as for mixed light exposures.

Artificial continuous light can be set equal with daylight. This will not be mentioned in any of the following illustrations.

SUMMARY OF THE INVENTION

The concept of this invention —insofar as it concerns mixed light— is the result of the following considerations. One can perceive a picture with mixed lighting as two pictures taken simultaneously with different sources of light. First a picture with daylight, as a rule, for background and second, a picture with flash, as a rule, for the foreground. When both of these exposures, simultaneously executed through the proper automatic equipment, are lighted correctly, then the picture itself, with mixed lighting, will also be correctly lighted. It is then possible, for every type of camera, to choose and put together such exposure-light-regulations and to prepare such arrangements. In the event of taking the picture, both automatic systems will be effective.

A prerequisite for the effective combination of both systems is that, directly or indirectly, the diaphragm be adjusted (set) at first, and that in further operation the adjusted diaphragm for both automatic systems forms the common, not further variable, set factor. On this concept, the inventive method is based. In order to fulfill the necessary requirement in every case, it is necessary to select and compose adapted and mutually corresponding exposure systems for daylight and flash. For this, various combinations of known exposure-control systems inclusive of electronic systems, are possible. But all combinations must fulfill the basic condition that, by an initial preadjustment, directly or indirectly, the diaphragm aperture is brought to the proper setting and needs no further adjustment until the end of the exposure. This basically simple rule apparently has not come to the attention of the man in the art, so that until now no automatic exposure control for proper illumination of mixed light exposures have become known, although the necessary elements for the proposed method are already available. The following mentioned and described embodiments do not at all exhaust the possibilities arising from these basic conditions.

This generally applicable rule can often be confined according to the present state of the art, so that the flash-automatic regulation determines the diaphragm opening through the distance setting, with eventual consideration being given to a changeable flash volume-intensity. This change is possible a to the magnitude as well as to the duration of the flash. The expressions "volume" as well as "intensity" mean the total lash illumination effect.

The invention proceeds from the basic concept that in photographic cameras with automatic flash-light and automatic daylight regulation, as well as in mixed light illumination (simultaneously through day and flash), automatic light-responsive exposure allows the taking of correctly lighted pictures, without burdening the user with unnecessary requirements.

This is achieved by the invention through the method which, under photographic conditions which call for the use of combined daylight and flash, provides the camera with daylight automatic means for taking exposures under daylight conditions and distance-dependent flash automatic means for taking exposures under flash conditions. As a first step, the camera is manually set for the distance between the camera and the object in the predetermined foreground, which is to be illuminated by the flash. Simultaneously and automatically, thereby, the flash exposure control is actuated in all cameras with changeable, as well as in cameras with unchangeable, diaphragm aperture. The aperture, however, remains unchanged after the first step. Thereupon the automatic daylight-exposure control is actuated according to the daylight intensity, in view of the prevailing aperture after said first step, and, finally, said automatic daylight control sets the proper daylight-exposure time.

It is necessary to distinguish between two kinds of distances:

a. the distance set at daylight exposures for obtaining sharp pictures by precise focusing.

b. the foreground distance which is the distance between the camera and an object to be illuminated by the flash.

In order to avoid extremely long durations of exposure, the adjustments are made so that the diaphragm opening, as well as the flash volume or intensity correspond to each other in relation to the distance set initially.

For the extreme case, in which the camera is equipped with an objective which has an unchangeable diaphragm opening, the adjustment is made so that the flash volume or intensity is set according to the distance. Furthermore, the daylight automatic control system regulates the duration of exposure according to the light meter as a function of the objective diaphragm, and following that, the shutter is released.

For the methods and arrangements of the present invention, in several embodiments, only those daylight automatic control systems which operate as a function of the diaphragm aperture and the daylight intensity are applicable. These automatic daylight control systems set the exposure time. Other daylight control systems, for example, those which operate as a function of the exposure time (that means those working inversely to the formerly described), cannot be used for the described special embodiments of the present invention (for instance, embodiments 1, 2, and 4).

For cameras with continuously changeable diaphragm openings, the following procedures and arrangements are usually provided, in which the sequence of the procedures is important:

1. The automatic for flash pictures is so arranged, that through the setting of the distance between the camera and the chosen foreground, in view of a given flash index, the diaphragm aperture is automatically selected.

2. The previously selected diaphragm opening, which was selected through the distance setting (1), remains fixed in the daylight control system throughout the length of the exposure.

3. The automatic for daylight exposures is arranged so that, in addition to the adjustment of the diaphragm aperture according to par. (1), the corresponding duration of exposure is selected automatically by means of the electric light meter.

4. As soon as the flash is connected, in the usual way, both systems are ready—that is, no further adjustment is necessary. At the release, both systems work simultaneously and independent of each other.

The course of all mentioned singular processes can, in a well known way, ensue through application of familiar means and devices. The combination of all selected means, the sequence, the limitations, and the procedures producing the desired effects are, however, new.

A camera with such a combination has the further advantage that pictures are possible with either daylight, flash, or both together, without any special changes. It is at all times ready to take daylight, flash, or mixed light exposures, while a special diaphragm adjusts itself automatically for the prevailing foreground distance. When this limitation of the special diaphragm is not desirable, adjustments may be made for voluntary selection of the diaphragm opening in daylight photos.

Such an exposure control can be applied to most of the well known camera systems, including the Reflex Mirror Cameras, and is especially helpful in conjunction with the so-called electrical shutters; i.e., where the exposure time is controlled through an electrical time-circuit, which is influenced by a photoelectric cell, depending on the general brightness.

For the selection of the exposure control systems, the following rules apply:

1. Of all automatic and semi-automatic exposure control systems for daylight, including those with electronic shutters, those are preferably serviceable which, with pre-adjusted diaphragm openings, change the duration of the exposure.

2a. For a camera with only an unchangeable diaphragm opening, a flash-control-system is necessary with changeable flash-index.

b. With a camera with continuously changeable diaphragm opening, a system may be combined, in which, for constant flash index, the diaphragm opening automatically changes according to the distance of the object.

c. An alternative to (b) is a combined system in which the flash index and the diaphragm opening, depending on each other, are adjusted commonly according to the distance.

Systems such as those in 2c above apply, for example, to differential or planet-gears, as they are already known relative to exposure control for adjustment of two variables which are dependent upon each other. (In this case, the two variables are the flash index and the diaphragm opening.)

Rule 2c makes possible the selection of a specific diaphragm opening, as desired.

An advantage of the described equipment results from an additional arrangement, which will overcome the following shortcomings in present cameras:

1. For many daylight pictures, the depth of the field cannot be precisely adjusted to a certain object at a certain distance. It is in the interest of the picture as a whole, to comprise and adjust the objective for the distance which will bring out the main point of the picture.

2. The flash photo, as well as the combination flash and daylight photo is generally adjusted for a certain object, person or group in the foreground. In order to illuminate this object correctly, the exact distance must be known, and a certain selection on the flash system be effected. Accordingly, the distance selections in both automatic light control systems will be different.

In order to overcome these shortcomings as far as possible, according to the invention, a special arrangement is provided on the camera—completely independent from the distance focusing device (which is for the depth of field of the photo), for the selection of a desired distance, which determines the diaphragm opening.

This additional arrangement for a special distance adjustment also offers another advantage; for example, when artistic requirements of a photograph so dictate, the illumination of the foreground may be modified to the degree desired, through simple means.

In order to perform both distance adjustments simultaneously according to the invention, a coupling-connection which may be rendered effective or ineffective at will, is provided between the distance setting of the objective and that for the freely eligible distance.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which

DESCRIPTION OF THE PREFERRED EMBODIMENTS

Figure 1:
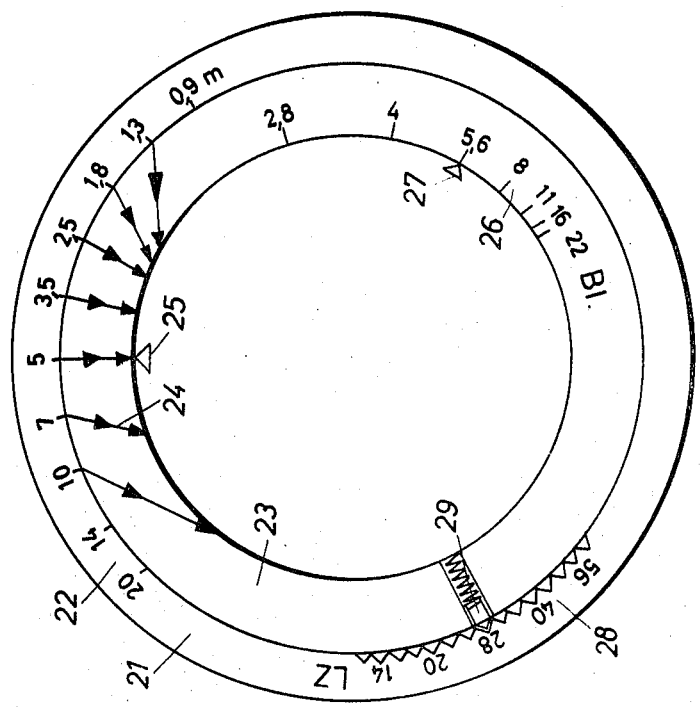
FIG. 1 shows foreground distance adjustment rings for a camera according to the invention with linearized aperture scale.

The following embodiments illustrated in the Figures have many common features;

a. Arrangements to switch in the flash device are provided in the camera so that flash exposures and daylight exposures can be taken simultaneously.

b. The distance adjustment for the foreground is effected independently of the depth of field adjustment, focusing of the objective, or a substitute symbol adjustment. Many existing cameras do not provide means for distance adjusting at all. This proves that, at daylight exposures, one can eventually omit distance adjusting means. But for automatic flash exposures the adjusting of the foreground distance is indispensable, because it is this distance mainly that determines the volume of intensity of flash illumination needed for the flash exposure.

c. The foreground distance adjustment according to (b) preferably precedes the switching in of the daylight exposure control.

d. The distance control of the foreground according to (b) automatically effects a corresponding angular motion of the diaphragm ring and/or a corresponding variation of the light intensity.

e. Through the diaphragm adjustment (b–d) or the light intensity adjustment, the correct flash index is already taken into account.

EMBODIMENT 1

The cameras of this group are characterized by a linearized diaphragm scale (scale with equal intervals on the diaphragm ring). The control of the flash exposure is shown diagrammatically in FIG. 1. The foreground distances for the flash exposure are registered on the distance adjustment ring 1. The adjustment is effected beneath the distance index mark 3 which simultaneously serves for blocking the ring. The ring 1 slides coaxially relative to the diaphragm adjusting ring 4 with which it can be coupled by a spring-coupling 8 for different index values 7. On the diaphragm adjusting ring 4, the numbers 5 which indicate the diaphragm setting are registered in equal angle intervals as the distance numbers 2. The actual adjusted diaphragm number 5 is given by the objective-fixed mark 6. The numbered rows 2 and 5 correspond to the international graduation for diaphragm series. The diaphragm opening, as, for example, an iris diaphragm (not shown in detail in FIG. 1) is changed by rotating the distance adjusting ring 1 and, thereby, the diaphragm adjusting ring 4, in the conventional manner.

The arrangement of these numbers is so planned that for each index number adjustment 7,8 each diaphragm setting by the prevailing distance results inherently in the index number. This assures that the relevant diaphragm opening will be adjusted for each index-number-coupling 7, 8 coupled with each adjusted distance. All of this occurs automatically from exposure to exposure. Only upon changing of the sensitivy of the film must the coupling to another film-index-number take place.

The blocking of the distance adjusting ring 1 through the distance mark 3 by means of the teeth 9 is necessary because ring 1 is, due to tension of a helical spring 16, within ring 4, and tends to rotate both rings clockwise. The helical spring 16 is placed in a notch or groove 17 running along part of the circumference of ring 4. The end of spring 16 is fastened to a pin 18, which is attached to the objective support body so that at counterclockwise angular movement of ring 1, the spring 16 is tensioned. This arrangement is for automatically resetting the distance adjusting ring to its home position, after the exposure.

In order to ensure that for each distance adjustment by means of ring 1, the flash device is also automatically switched in, the following arrangement is provided:

An angular link 11, subjected to the tension of a small spring 14, closes a contact 12 connected to the line 13 for actuation of the flash device. Contact 12 is always closed when the ring 1 is out of its home position. If the blocking mark 3 is unlocked, then ring 1, under tension of spring 16, is moved clockwise until abutment 10 mounted on ring 4 abuts against the arm of link 11 and moves the latter until abutting against pin 15. As a result, the contact 12 is opened, and the flash device is disconnected.

Disconnecting of the blocking mark 3 is effected by a mechanical (it may also be electrical) connection with the shutter (not shown) at the moment when the shutter reaches its end (home) position.

If both general and specific requirements described above are fulfilled, the procedure of an automatic exposure control takes place in the following manner:

The foreground distance, determined by a distance meter or by pacing the distance of the object to be illuminated by flash, is set on the foreground distance ring 1. This setting of the ring 1 automatically results in the proper adjustment of ring 4, and thereby also of the diaphragm opening. Relative to this diaphragm opening, the daylight automatic control of the camera now sets itself by automatically adjusting the exposure time according to the daylight intensity. Upon releasing the exposure, a proper illumination of fore- and background occurs. The shutter, in returning to its home position, unlocks the blocking member 3, and thereby causes the reset of ring 1 (by spring 16) and, simultaneously, interruption of the electric line 13 to the flash device. The operating procedure to be followed during mixed light exposures, is contained in the following:

1. When changing film sensitivity, set a new sensitivity index 7 by means of spring coupling 8.
2. Setting of the foreground distance on ring 1 automatically sets the proper diaphragm for flash light exposures.
3. The usual setting for daylight exposures automatically sets the proper exposure time for the diaphragm selected according to 2.
4. Release.

EMBODIMENT 2

The difference between this second embodiment and embodiment 1 consists only in that the camera has no linearized diaphragm scale, but has one with unequal intervals (for example, logarithmic). In this instance, the simple solution according to case 1 and FIG. 1 fails. FIG. 2, however, proposes and illustrates a special solution to the problem whereby, at a given film sensitivity index, a distance setting also sets the proper diaphragm automatically.

On the distance adjusting ring 21, the foreground distance numbers 22 are applied in equal intervals (linearized as in example 1). A second ring, the diaphragm rings 23, is arranged coaxial to and within the ring 21, and is connected to the latter by the spring coupling 29 which, in the same manner as in example 1, can be adjusted to the given index number of the index row 28 on ring 21, if a change of the index number occurs as, for example, upon variation of the film sensitivity. The core of the inventive concept is in guiding lines 24 on ring 23. Each one of seven guiding lines shown connects the set distance number with the objective-fixed distance mark 25. The ends of guiding lines 24, accentuated by arrow-points at the inner circumference of ring 23, have the same spacing as the diaphragm numbers 26 on said ring 23, which identify the actual diaphragm opening through diaphragm mark 27. The above-explained advantage of this solution is also maintained for variation of the sensitivity index number by a new coupling 28, 29. This is because the index-number-row 28 is linearized corresponding to the same scale as the distance number row 22. Also, for these index numbers, the diaphragm corresponding to the distance is properly adjusted.

The combined ring 21, 23 of this second case, therefore, is equal to the ring combination 1 and 4 of example 1. All possibilities of case 1 can be used also in case 2. The rule to be used for example 2 is the same as in embodiment 1 (see above).

EMBODIMENT 3

Characteristic of this embodiment group is a camera, the daylight automatic control of which adjusts a time-diaphragm pairing. In such cases, in comparison with examples 1 and 2, the setting order for mixed light exposures is different in that, at first, the daylight automatic is balanced. For the resulting time/diaphragm pairings, the setting of the foreground distance according to example 1 selects the specific diaphragm necessary for flash exposure, whereby the proper exposure time for daylight exposures results automatically. Similarly, as for example 1 and the nomenclature of FIG. 1, the rule is now:

1. For variation of film sensitivity, set a new index number 7 by means of the spring coupling 8.
2. Balancing of the time/diaphragm pairing by the daylight automatic.
3. Setting of the foreground distance on ring 1.
4. Remaining settings for daylight exposure.
5. Release.

EMBODIMENT 4

For this embodiment, a camera is chosen which has only one constant diaphragm: normally, diaphragm-opening 8. In this case, through the setting of the foreground distance, not the diaphragm opening, but the flash light volume intensity is changed.

Figure 3:
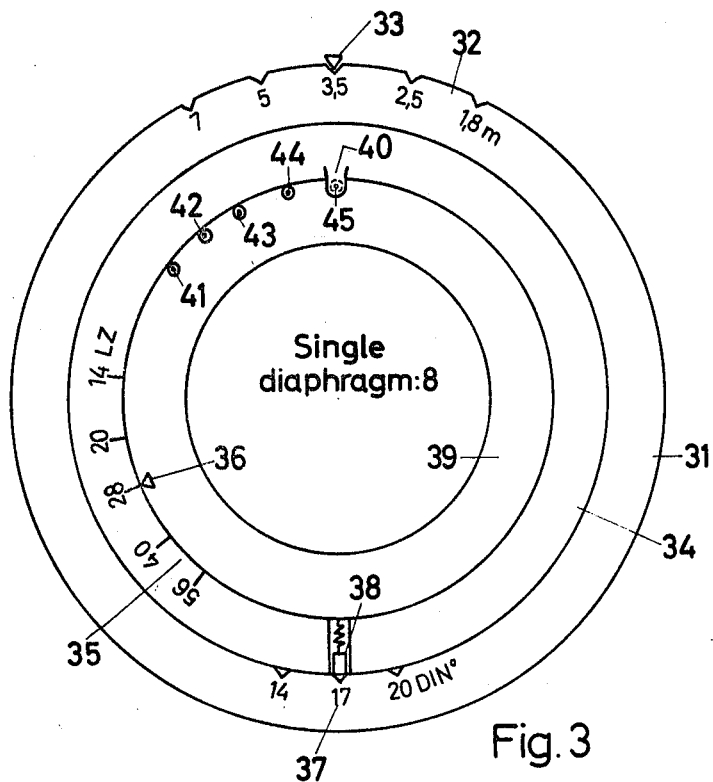
FIG. 3 shows adjustment rings for a camera with constant aperture and adjustment of the flash index according to the distance of the foreground object to be exposed to the flash.

FIG. 3 for this embodiment shows the arrangement of distance-adjusting-ring 31 with distance numbers 32 and fixed distance mark 33. Coaxial to ring 31 is ring 34 on which the flash indices 35, with equal intervals and in the same order or scale as the distance numbers, are located. At the mark 36, the necessary and automatically set index can be read. The values of the film sensitivity in DIN° and/or ASA are registered on ring 31. The coupling of both concentric rings 31 and 34 is effected by the spring-locking 38.

On a fixed ring 39 five small push buttons 41–45 are arranged on a circle line with equal intervals: With these push buttons, divided or partial energies of the flash device may be switched in:

by push button 41: 25 percent of the full intensity
by push button 42: 36 percent of the full intensity
by push button 43: 50 percent of the full intensity
by push button 44: 72 percent of the full intensity
by push button 45: 100 percent of the full intensity To ring 34, a resilient switching arm 40 is attached which, for each set distance number, presses down a push button (in the shown case push button 45) corresponding to the full light energy of the flash device. If the distance setting ring 31 is turned counterclockwise, so that the distance becomes smaller, then a smaller partial energy is switched in. Simultaneously, the new set value indicates the varied flash index number, through mark 36. The operating procedure is as follows:

1. Adjustment of coupling 37/38 for variations of the film sensitivity.
2. or 3. Setting of the foreground distance through ring 31.
3. or 2. Setting of the daylight exposure. 4. Release.

EMBODIMENT 5

All of the cameras adapted for cases 1 and 3 are relevant for this group; namely cameras with linearized diaphragm scale. Cameras with non-linearized diaphragm scale can be used also, if the construction is analogously modified in the following manner.

Figure 4:
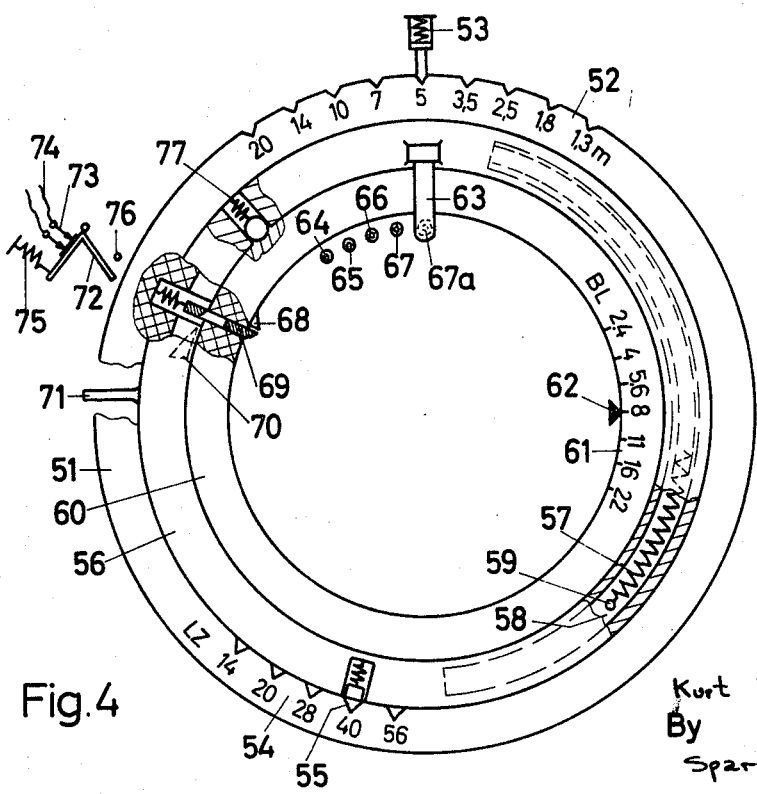
FIG. 4 shows, for a camera with changeable diaphragm aperture, adjustment rings according to FIG. 3, with an auxiliary ring for various couplings of the foreground distance, and an adjusting ring for larger foreground distance with the diaphragm aperture adjusting means or for smaller foreground distances with flash adjusting means.

The characteristic feature of this embodiment group, represented in FIG. 4, is the control of the flash exposure by regulation of the diaphragm as well as by variation of the flash intensity. Therefore, a flash device is to be used which allows for the switching-in of partial flash energies in a plurality of steps. Most preferred is a transistor-controlled device with push-button actuation for the various steps. At the objective, a corresponding number of small push buttons are arranged, which are actuated by the automatic control. (For flash devices, the intensity of which is controlled by resistances, the push buttons may be replaced by a variable resistance with contact taps. The embodiment 5 deals only with 20 push buttons.)

The necessity of th the regulation of the flash illumination in the two mentioned manners, results from the following:

If the foreground objects near the camera are to be illuminated by a flash, a very small diaphragm would have to be used. But then, at unfavorable light conditions, the problem for the daylight exposure would prevail in that the exposure automatic cannot adjust for an exposure time requiring the use of tripods.

For such cases, often occurring in practice, the present invention is applicable. The present invention is based on the concept that the diaphragm opening should not decrease below a certain limit for mixed light exposures. If further reduction of the flash influence on film or plate appears necessary, this reduction is performed by diminishing the flash energy in steps.

In the regulation, the change from diaphragm control to light energy control occurs automatically upon reaching a certain minimum diaphragm aperture. In the chosen example shown in FIG. 4, the diaphragm aperture 8 is the smallest diaphragm aperture for flash and mixed light.

Figure 2:
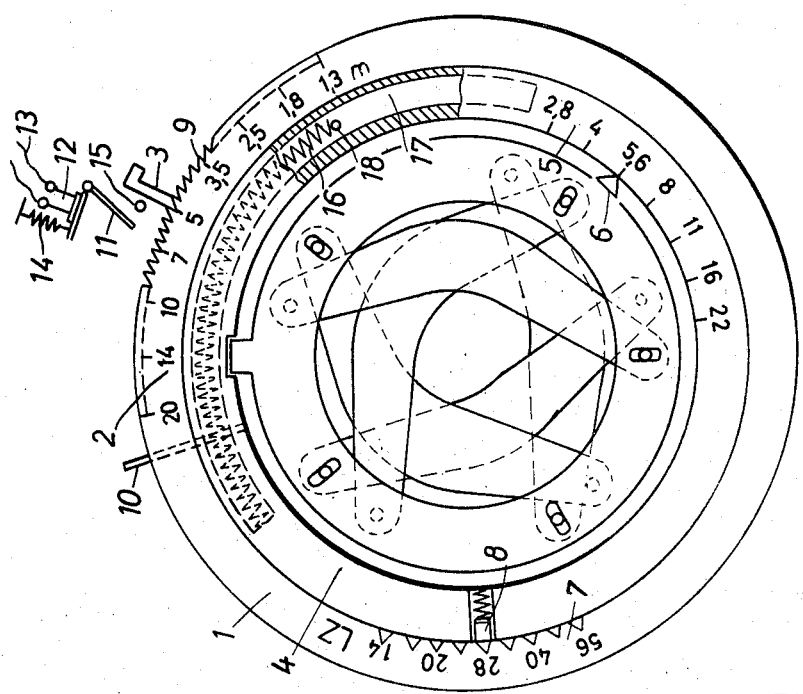
FIG. 2 shows foreground distance adjustment rings similar to that of FIG. 1 but with non-linearized aperture scale.

In FIG. 4, the modifications are evident which result from the formerly described solution case 1 (FIG. 1). The distance setting ring 51 with distance numbers 52 and fixed blocking mark 53 are known from embodiment 1, as well as the arrangement of indices 54 and associated coupling 55. A third ring, auxiliary ring 56, which has a different use, continuously remains coupled with the distance setting ring 51 through index coupling 55. But in relation to the interior, the coupling of the auxiliary ring 56 is not permanent, as described later on.

In the auxiliary ring 56, the helical spring 57 is embedded within the ring-shaped notch 58, and is attached at one end to the objective-fixed pin 59. The function of spring 57 here is also that it is tensioned at the rotation of rings 51/56 necessary for the distance setting. During the exposure, the distance setting ring 51 remains under spring tension because of the blocking action by the fixed mark 53.

In this example, means are also provided—but not shown—for releasing blocking mark 53 after resetting of the shutter, preferably by a mechanical connection, so that ring 51, under tension of spring 57, returns to its home position.

A third diaphragm adjusting ring 60 is the innermost ring. On this ring, the adjusted value of the diaphragm settings which appear thereon, is indicated by fixed mark 62. So far, all is known and understandable from example 1. Those parts copending with the regulation of the flash intensity now follow:

Attached to the middle ring 56 is a switch arm 63, the free end of which is spring loaded so that, upon traversing the four push buttons 67a–64 at each of the set small distances 3,5–2,5–1,8–1,3 m, it pressed down one of the push buttons and thereby switches in a corresponding part-energy of the flash device. The rating of the part-energies here is also effected in accordance with the numeric rule used in the sequence in indices. As in the described example 3, the progression of the light intensities is as follows:

by push button 64:   25%
by push button 65:   36%
by push button 66:   50%
by push button 67:   72%
by push button 67a:  100%

To influence the film or plate, the diminution of the light intensity is equivalent to the use of smaller apertures 32, 22, 16, and 11. By the use of part-energies of the flash device, therefore, the disadvantages of small apertures can be avoided. A further advantage of such kind of regulation is the care of the batteries in the flash device. For this inventive solution, the proper selection of the controlling means, aperture or light intensity variation, occurs automatically, without action by the user.

For large distances in the foreground (20 to 5 m in the example shown), the diaphragm aperture is diminished from 2.4 to 8. If the setting of ring 57 changes to smaller distances less than 5 m, then the diaphragm is not diminished further (it remains set at 8), but the stepwise switching out of the light intensity by pressing the push buttons 67, 66, 65, and 64 occurs automatically. This "change" to the other regulation means, occurs automatically in the following manner:

In the interior or ring 60, there is a noselike abutment 68. In the position of the distance ring shown, that is at 5 m foreground distance (diaphragm setting 8), the fixed (objective fixed) spring-loaded locking part 69 causes the abutment 68 and thereby the ring 60 to be maintained in the momentary position. At the same time, diaphragm 8 remains open. If distance setting ring 51 is further moved counterclockwise, then the connected rings 51, 56 are released from ring 60, because the resilient ball rest 77, being a sufficient joint in the absence of resistance, is released from the rest position and follows the rotation to the left.

As already described in embodiment 1, a device is provided for automatically switching in the safety switch for the flash device, simultaneously with each distance setting. Angulated link 72, contact 73 inserted in line 74, and spring 74, again serve for this purpose. The contact 73 is dept closed as long as setting ring 1 is out of the home position.

Herewith, all diagrammatically shown arrangements serving especially for the setting and exposure itself are described. Now, only those arrangements are to be explained which have to reestablish the home position after exposure. First there is the connection (mentioned but not shown) between end-positioned released shutter and blocking mark 53, by means of which the block 53 is released after resetting of the shutter so that, by means of spring 57, rings 51 and 56 move clockwise to their rest position. The following action takes place on the way to that position.

Beneath auxiliary ring 56, and concealed, is attached unlocking key 70 at such distance from the fixed locking bar 69 that it reaches this bar first in that position of rings 51/56, which corresponds to the distance of 5 m. Upon striking, unlocking key 70, by means of a corresponding oblique surface at unlocking bar 69, moves the latter to the exterior, so that the unlocking bar remains withdrawn and the nose-like abutment 68 finds no resistance. The abutment 71, attached to auxiliary ring 56, comes into action on the same home path of both rings 51 and 56.

Shortly before reaching the rest position it strikes the arm of the angulated link 72, and moves it to the abutting pin 76, so causing contact 73 to disconnect. (This procedure is the same as already described for example 1.)

Finally, upon reaching the rest position of rings 51 and 56, the following occurs:

The rest position of ball rest 77 on ring 60 serving as a coupling, is so chosen that on the home path of all three coupled rings, through the tension of spring 57, ring 60 comes to rest first, when the diaphragm position 2,4 is reached. The resting point of both other rings is displaced some angular degrees forward in clockwise direction so that when ring 60 is stationary, two other rings are yet in motion. Furthermore, by means of the tension of spring 57, effective on ring 60, the ball rest 77 is removed from its rest position in ring 60, and accompanies ring 56 to the end position. In this manner, therefore, the rings 60 and 56 are uncoupled, diaphragm ring 60 is per se freely movable, and for daylight exposures without flash can be moved into every position, so that the small apertures can be used again, The coupling, hereby, does not interfere, because in the end position of ring 56, it is out of the moving path of ring 60.

So it is assured that after each exposure at mixed light, the home position is automatically restored and that all three kinds of exposures (daylight, flash light and mixed light) are immediately possible from this home position.

All mentioned mechanical devices (coupling, blockings, rest and switch devices) are shown diagrammatically and described. Which constructions, in detail, are to be selected, depends on the type of camera and other specific conditions. For all these mechanisms, sufficient reliable constructions are known.

That many problems of this example are solved, is to be seen from the fact that the same simple rule followed in case 1 can be applied for automatic flash exposures as well as for example 5.

1. Upon change of film sensitivity, adjustment of a new index 54, by means of spring coupling 55.
2. Adjustment of the foreground distance on ring 51 (for selection of diaphragm and flash intensity).
3. Usual adjustment of daylight exposures (for selecting the proper exposure time for the selected aperture).
4. Release.

EMBODIMENT 6

This embodiment relates to cameras which, instead of having numerical settings of the aperture, time, and distance use only so-called exposure symbols to that the user sets a certain symbol according to the nature of the object (portrait, group, landscape) and to the kind of clouds. A flash exposure is also provided following the sequence of symbols on most cameras, but in such manner that either a daylight exposure or a flash exposure can be adjusted, but not both simultaneously.

According to the invention for the symbol "flash," a switching option is provided for allowing simultaneous flash exposure with a daylight exposure adjusted through the symbol while the automatic, taking into account the given conditions of the exposure control, leans upon the already described rules and examples. The proposed additional switch on the flash symbols is preferably an electric switch contact inserted in the line between shutter and flash device.

EMBODIMENT 7

From the foregoing group of example 6 (cameras using symbols), that camera type is selected on which, through selection of a given exposure symbol, an associated time/diaphragm pairing is set and it is possible, within this pairing to set a given aperture, so that the associated time is adjusted automatically. This type of camera maybe handled in the same manner as that of example 3. It receives a distance adjusting ring and so on, according to FIG. 1. The rule for mixed light exposures is:

1. Upon change of film sensitivity, set a new index number 7 by means of spring coupling 8.
2. Setting of a symbol.
3. Setting of the foreground distance on ring 1. 4. Remaining adjustment for daylight exposure.
5. Release.

In the above-described example, the question remained as to how to couple both distance-adjustment devices: the distance-adjustment device for the foreground to be illuminated by flash (flash distance-adjustment) and the distance-adjustment for the objective in direction of the optical axis (objective distance-adjustment).

This problem for the special case of automatic exposure control for exposures at flash and mixed light is solved by the following examples.

The solution consists in that the scale of the objective distance-adjusting ring is linearized and has a division of distance and angle graduation identical to those of the flash distance-adjusting ring of FIG. 1 and 4. If, now, a coupling of these two rings is effected with equally linearized scale divisions, then through the distance adjustment of both coupled rings simultaneously the objective is shifted along the optical axis into proper position for the given distance and the aperture is adjusted, which is necessary for the flash exposure at the given distance and the given flash index.

The transforming of the angular movement of the objective distance-adjusting ring with linearized scale into a movement along the optical axis is achieved by the inventive feature that, through an adapted shifting curve, preferably cut in the cylindrical sleeve of the objective distance-adjusting ring, or in the objective sleeve itself and sliding along a non-rotatable pin, the angular movement direct or indirect is transformed into such a movement of the objective sleeve along the optical axis that, owing to the interrelation of the shifting curve for each distance adjustment on the linearized scale of the objective adjusting ring, the proper shifting distance, such as displacement of the objective along the optical axis in view of the film or other layer carrier, is attained.

Transformations of angular movement into axial movement by means of guiding curves per se are known also in camera constructions. But the use for the special case of linearized distance scales and associated coupling is new, and considerable technical progress is attained thereby.

Figure 5:
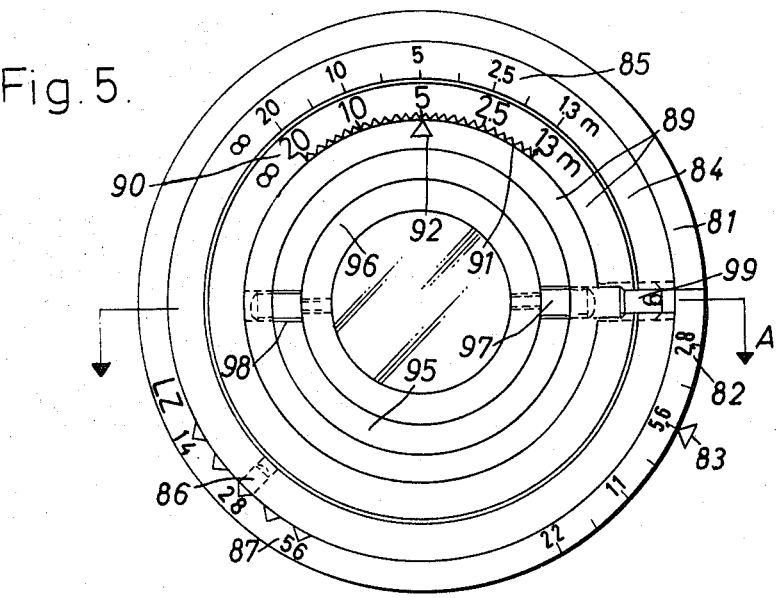
FIG. 5 is a front view of a camera objective with adjustment rings, shown here with an objective-coupled distance ring.
Figure 6:
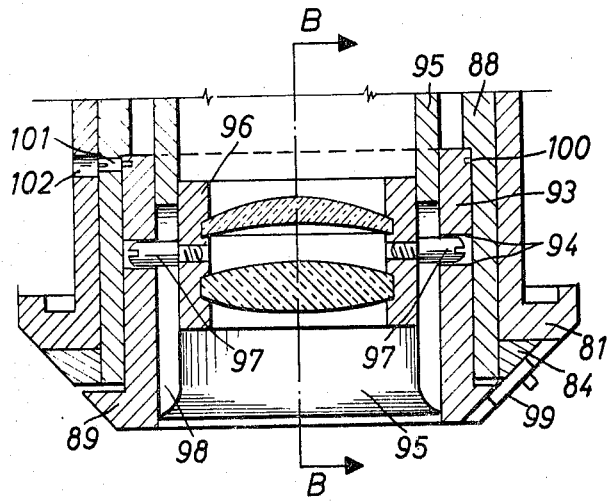
FIG. 6 is an axial section of the arrangement of FIG. 5.
Figure 7:
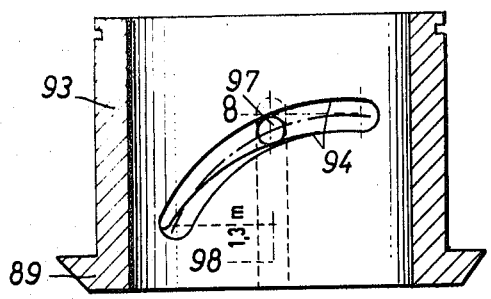
FIG. 7 is a separate axial section of an objective-coupled distance ring with governing means.

FIGS. 5–7 show one of the possible embodiments. FIG. 5 shows the plan view of an objective socket, FIG. 6 shows a section A–A of FIG. 5, along the optical axis, and FIG. 7 shows the inner view of the objective distance-adjusting ring taken along line B—B of FIG. 6.

The arrangement of the distance adjusting ring for the flash exposure and the diaphragm ring is basically inclined to that of FIG. 1 and 4, only with the difference that now the diaphragm ring is external and the distance adjusting ring is internal.

In the embodiment shown in FIG. 5 and 7, the diaphragm ring 81 with the linearized diaphragm scale and the associated fixed indicator mark 83 can be coupled with the coaxial movable flash distance adjusting ring 84 containing on the other side the linearized distance scale 85. The connection between both rings 81 and 84 is effected by spring coupling 86 which rests in the indentations of the flash index scale 87 (DIN° scale) of diaphragm ring 81, so that upon a change of the flash index or film sensitivity, both rings 81 and 84 can be adjusted relative to each other. The numbered rows 82, 85, 87 correspond to the interrelationship of the international diaphragm graduation. With this and with the mutual arrangement, the associated diaphragm is automatically set for each adjustment, the associated diaphragm is automatically set for each adjusted distance for the flash-illuminated foreground at each index.

The associations may be seen from FIG. 1.

The additional feature lies in the objective distance adjustment ring 89, the distance scale 90 of which corresponds angularly exactly to the distance scale 85 of the flash distance adjusting ring 84. This ring 89, at its inner edge, can contain in series small indentations 91 which allow a fixed adjustment of a selected distance through a fixed indicator mark 92 provided with a blocking device. (If blocking is not necessary, then a simple fixed mark is sufficient.)

The ring 89 extends in a sleeve 93 which, in its cylindrical wall, contains at least one curve-like slot 94. The sleeve 93 is rotatably inserted between the fixed cylinders 88 and 95. Within the fixed cylinder 95, slides the objective sleeve 96 into which, in the given example, two guiding pins are screwed, which slide in the curved slot 94. Into the fixed cylinder 95, two longitudinal slots 98 are cut to limit the movement of the pins 97 in such a manner that these and with them the objective sleeve 96, are only shiftable in direction of the optical axis, without rotation. If, therefore, the ring 89 for distance adjustment is rotated around the optical axis, then in the described manner, the objective sleeve 96 is moved along the optical axis at distances which correspond to the distance set on ring 89.

In FIG. 7 the sleeve 93 of the objective distance ring 89 is separately show. Each of both equal slots 94 has such a shape that the one curve end corresponding to the distance setting 'infinity,' tends asymptotically to a plane which is situated at right angle to the optical axis, while the other end of the curve, corresponding to the smalles adjustable near distance, has the smallest inclination in view of the optical axis. (In FIG. 7 this is clarified by the fact that at the ends of the curved slot 94, the associated distances 'infinity' and 1,3 m are registered.)

In the ring notch 100 at the sleeve 93, there slides a trunnion screw 101. In this manner, the objective is prevented from sliding out. For the actuation of screw 101 in the diaphragm ring 81, a bore 102 is provided. The connection of both rings 84 and 89 occurs through a coupling 99. The latter is in engagement conveniently at all exposures with flash or mixed light.

Therewith the stated problem is solved: By adjusting the distance on ring 89, the objective (depth of field) as well as the diaphragm aperture necessary for the flash exposure, corresponding to the foreground distance and the given flash index (film sensitivity), are properly adjusted.

The one additional rule is that it is necessary to ascertain that the coupling is engaged at flash exposures and those with mixed light. Daylight exposures (at which the coupling 99 remains disengaged), are effected as before.

For cameras of simpler construction, the "foolproof" feature can be further increased.

In addition to a (known) push button for adjusting the exposure regulation for daylight (daylight push button), a second push button is provided for the control of flash exposures (flash push button). By pressing down on the flash push button, the flash is switched in and the coupling 99 engaged. If both push buttons are pressed down, the camera is ready for exposures with mixed light.

A second setting is necessary only for the distance adjustment (symbol adjustment) on the objective adjusting ring 89.

In cameras where there are to be no different distance adjustments on both rings 84 and 89, scale 85 on ring 84 is not necessary, since ring 84 will not be rotated alone.

By using push buttons, means may be provided for automatic reset, after exposure of the bush buttons to the home positions. Such means may be similar to the embodiments 5 as already described.

Figure 8:
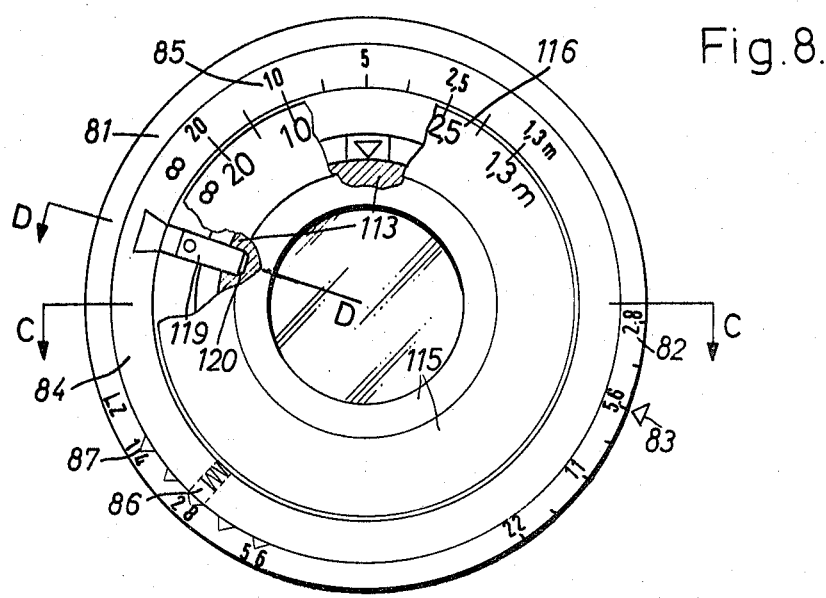
FIGS. 8–10 show an arrangement similar to that of FIGS. 5–7 for an exchangeable objective.
Figure 9:
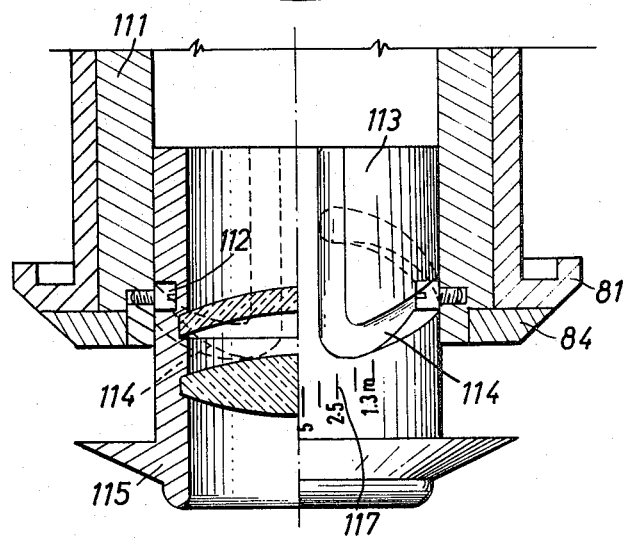
Figure 10:
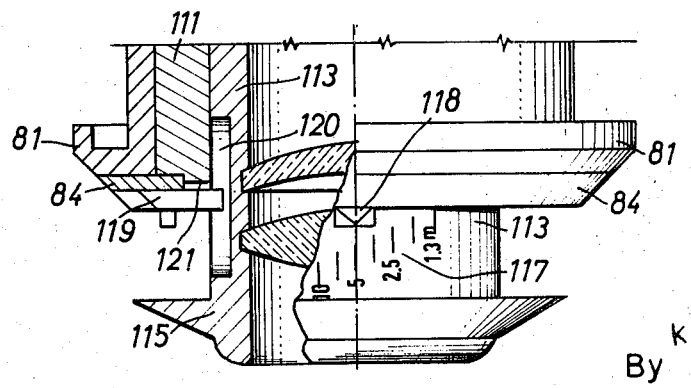

Another embodiments of a camera according to the present invention is shown in FIGS. 8–10. The arrangements of the adjustment rings, basically, is the same as in the preceding example. Different features are:

1. The guiding of the objective sleeve.
2. The coupling between the two distance adjusting rings.

With this variation, the exchange of objectives of different focus is simplified. Each newly inserted objective, according to the invention, has an individual guiding slot or groove cut into its sleeve, the curve of said slot or groove being adapted to the required variation of the distance adjustment.

FIG. 8 shows a plan view of the objective supports with parts broken away. FIG. 9 shows the axial section C—C according to FIG. 8, and FIG. 10 shows another section D—D according to FIG. 8, clarifying the arrangement of coupling 119.

All parts 81–87 have the same purpose and function as described for FIGS. 5–7. In the fixed cylinder 111, preferably, two guiding pins 112 are inserted to serve for receiving the objectives. The objective sleeve 113, in the example, contains two curved guiding slots 114 sliding about the guiding pins 112. The sleeve 113, in its front part, changes over into the objective adjusting ring 115 which contains the distance scale 116.

For a more convenient adjustment, the same scale 117— as shown in FIG. 10— is repeated on the outer cylinder wall of sleeve 113, namely as a curve-like scale. The curve of this scale corresponds to the guiding slot 114 so that at each angular position of ring 115, the adjusted distance by the user can be read from above at the fixed indicator mark 118.

The shape of the guiding slot 114 depends on the double function.

1. The curved part serves for the proper distance adjustment of the objective sleeve 113 in view of the film or layer-carrier.

2. The rectilinear or straight part serves for the introduction of the exchange sleeve 113 in the sleeve support 111 of the camera.

For insertion, the sleeve is first shifted into position. Then, by angular movement of ring 115, it is adjusted to the distance. A special protection against falling out or unintended removal seems to be advisable but is not shown.

The connection of both adjusting rings 115 and 84 is effected by means of the disengageable coupling 119 which also has to fulfil the requirement that the connection between both rings 115 and 84 is assured at each mutual position of the rings.

This is attained by by the novel feature that a slot 120 is cut parallel to the optical axis, in sleeve 113 of ring 115. In this slot, also, the engaged coupling pin 119 slides during the angular movement of ring 115 so that ring 84 on engaged coupling 119 must follow each angular movement of ring 115.

In order to offer sufficient freedom of movement to the coupling 119, the fixed cylinder 111 in the area of engagement of coupling 119 is shortened by a recess 121 in its peripheral length which is somewhat larger than the maximum angular movement of the distance adjusting ring 115.

In spite of all proposed simplifications thus far, there remains a technical problem:

This consists of the necessity to doubly adjust the film sensitivity, the first time for the automatic daylight exposure control and the second time by adjusting a new flash index, because any variation of the film sensitivity entails a corresponding variation of the flash index.

With this, the problem is to find a device by means of which any variations is realized by a single new adjustment, as a result of transferring over to a film of varied layer-sensitivity.

According to the invention, this problem is solved by dividing the flash distance adjusting ring into two coaxial mutually shiftable adjusting rings. The one which directly abuts the diaphragm ring is adjusted to film sensitivity, while the other is adjusted to a scale corresponding to the constants of the flash devices. These constants, multiplied by the coefficients of film sensitivity, yield the flash index. These constants are, specifically: flash intensity and efficiency of the reflector. All of these quantities must be graduated on the scale in the same interreletionship as the linearized diaphragm scale.

Figure 11:
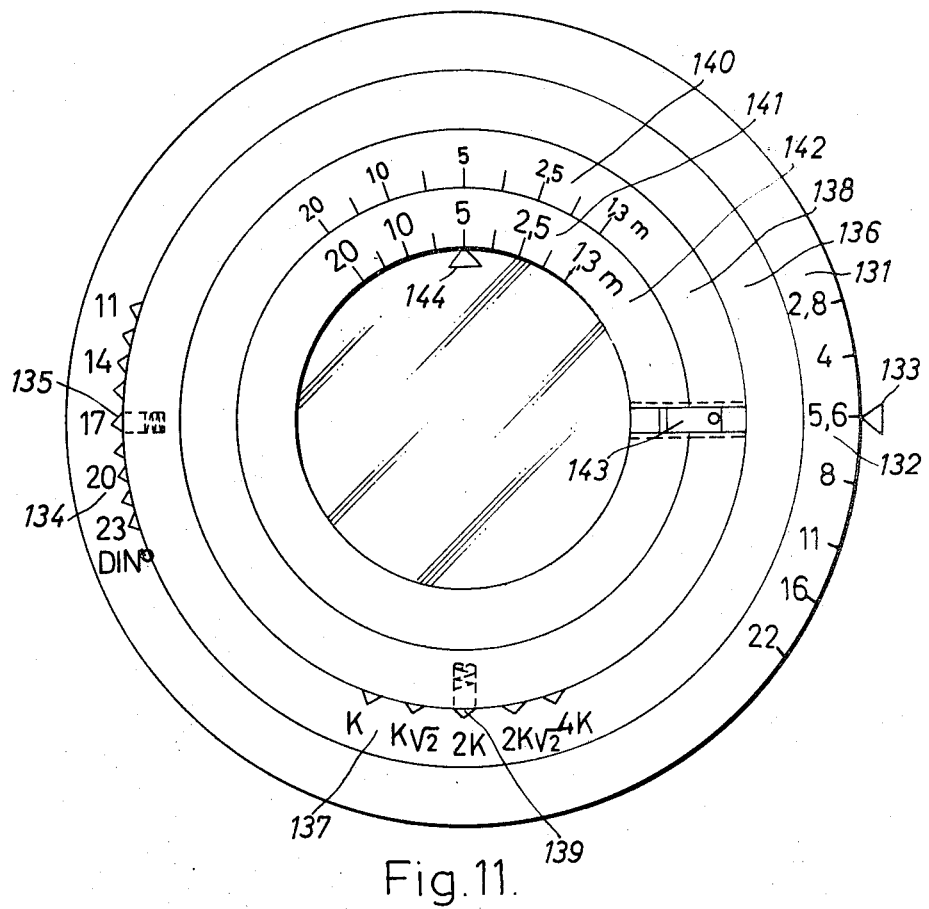
FIG. 11 shows an arrangement similar to that of FIGS. 5–7 and 8–10 for simplified adaptation to various film sensitivities.

FIG. 11 shows the performance of the present invention diagrammatically. The diaphragm adjusting ring 131 contains the linearized diaphragm scale 132. The actually adjusted diaphragm aperture is indicated by the fixed indicator mark 133. On the diaphragm adjusting ring 131 there is a second scale, the film sensitivity scale 134, the values of which are graduated in terms of DIN° or ASA. With ring 131 connected by the spring coupling 135, is the film sensitivity adjusting ring 136. The latter contains the scale of the above-declined flash constants 137, in the same graduations as the linearized diaphragm scale. Ring 136 slides around the coaxial flash distance adjusting ring 138, and can be adjusted through the spring coupling 139 to arbitrary values of scale 137.

On the flash distance adjusting ring 138 there is, as in the prior examples, the distance scale 140 for the flash illumination of the foreground. The distance scale 141, identical therewith, and equal, is on the objective distance adjusting ring 142 connected with ring 138 by a disengageable coupling 143.

As in the prior example, this coupling is engaged only for flash or mixed light exposures. The fixed indicator mark 144 indicates the distance set on the objective distance adjusting ring 142.

The actuation of the four rings in FIG. 11 is the same as in both previously described embodiments. The difference, as described, is that the flash distance adjusting ring 84 is functionally replaced by two rings: the film sensitivity adjusting ring 136 and the ring 138 for adjusting of flash device constants.

Figure 12:
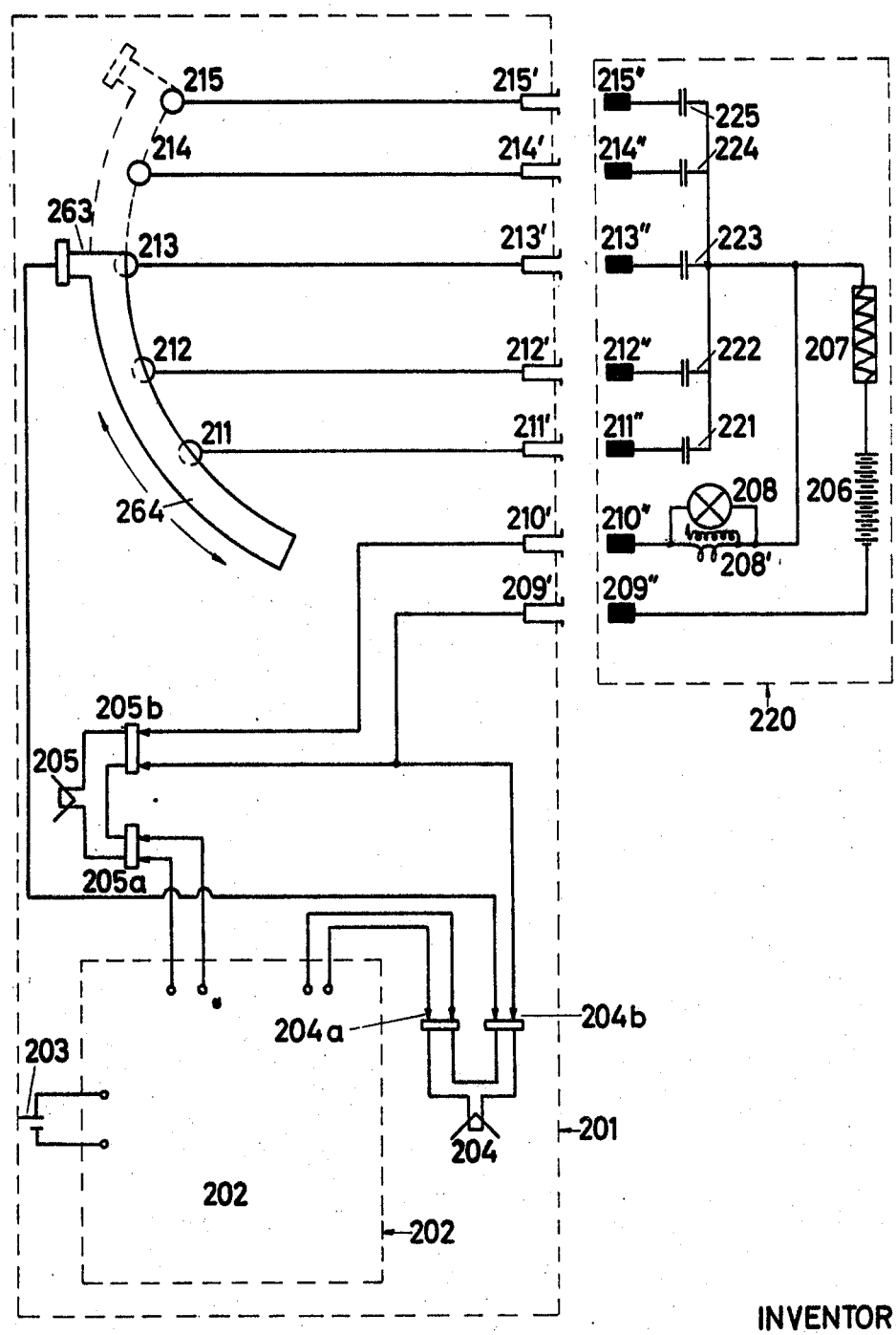
FIGS. 12–14 show the electrical connection for combined flash light and daylight illumination.
Figure 13:
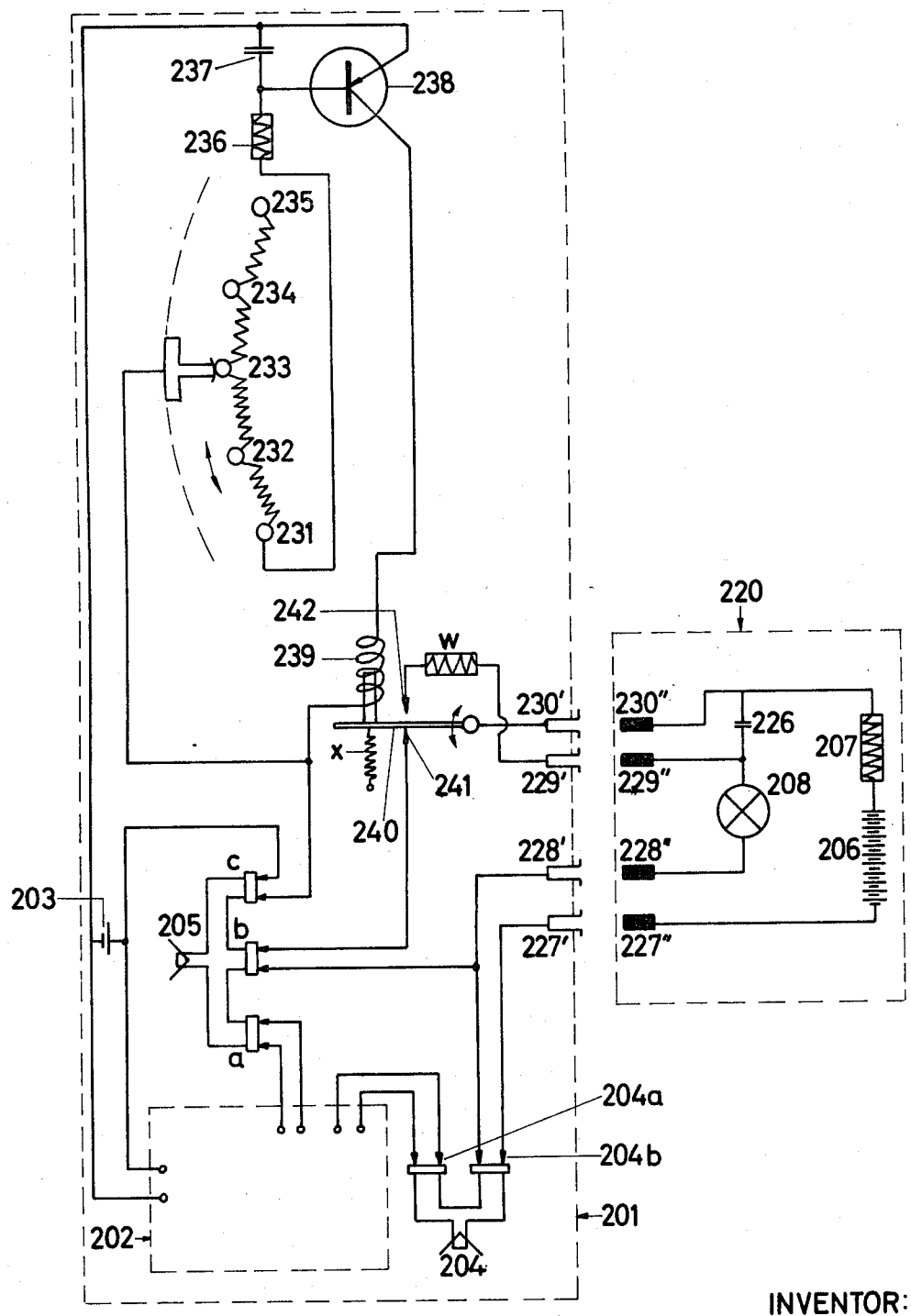
Figure 14:
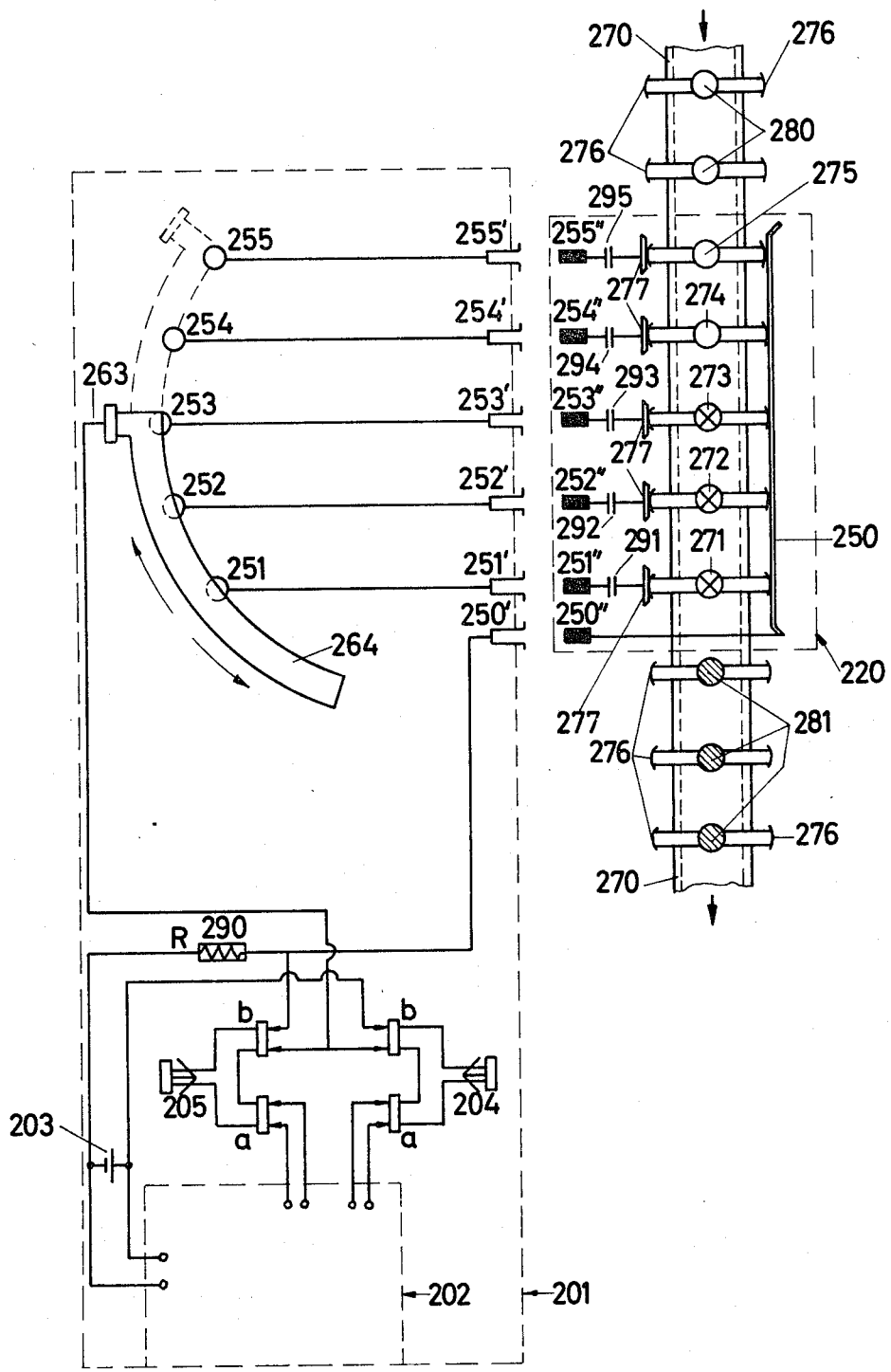

In the following, furthermore, three important variations of embodiments 5 shall be described (FIGS. 12–14). Common to these variations, is tee basic embodiment of FIG. 4 in which, for middle and large distances of the foreground, the flash illumination is adjusted by regulating the diaphragm opening. For small foreground distances, however, this is accomplished by diminishing the flash intensity.

EMBODIMENT 8

FIG. 12 shows the circuit. In this embodiment, the flash device comprises an electric flash bulb, the condenser of which is subdivided into five partial capacitances which according to the position of the switch-arm 63 or 263, automatically are switched on or off. If the diagram of FIG. 12, part 201 is the camera and part 220 a valve flash arrangement which may be connected to the camera by plug-connections 209' to 215' and 209'' and 215''.

The camera also comprises a well known daylight exposure control unit 202 not shown in detail. The type selected must, for a given diaphragm opening, adjust the exposure time according to the daylight intensity by mechanical, electromechanical or electronic means.

The electrical part of the daylight automatic and shutter comprises, for example, the camera battery 203. Secured to the daylight, as well as to the flash automatic, is the safety switch 204 which prevents an undesired release. Furthermore, the switch-in-contactor 205, actuated at release, is common to both automatic systems.

Contact arm 263 and curved switch contact 264 serves only for flash, for automatically adjusting the flash intensity for small foreground distances.

Therefore, the contact arm 263 corresponds functionally to the switch arm 63 of FIG. 4 (partly mirror inverted). The curved switch contact 264 is necessary for this embodiment, in order to connect in parallel, the required one of the five partial capacitances 221–225 of the flash unit, and at release, to discharge them.

Contacts 211–215 which are closed by the switch contact 264, serve the same purpose.

The connection of contacts 211–215 to the associated partial capacitances 221–225 in the flash valve device, is effected over the plug connections 211'–215° and 211''–215''. In the flash valve device, furthermore, are arranged as usual, the flash battery 206 or another electric supply; for example, a chopper with rectifier, flash resistance 207, and flash valve 208.

The procedure for an exposure with mixed light is as follows:

At first the narrow distance adjustment for the illumination of the foreground by rotating the distance adjusting ring 51 (FIG. 4) is effected. In the embodiment of FIG. 12, a distance of 2,5 m is assumed. To this corresponds position of contact arm 63 to contact 66 in FIG. 4, or contact arm 263 to contact 213 in FIG. 12, so that switch contact 264 closes and connects the contacts 211, 212, and 213 in parallel. Together with the adjusting movement away from the home position by means of ring 51 (FIG. 4), the safety switch 72–73 (FIG. 4) is closed. The latter corresponds to part 204b of safety switch 204 in FIG. 12. The other part of said safety switch, 204a, connects the camera battery in the circuit (not shown) of daylight control unit 202 so hat a photo-cell etc, is activated.

By the switching-in of safety switch 204b over plug contacts 209'–209'' a connection is closed. Through this, the flash battery 206 on the one side over flash resistance 207, and on the other side over safety switch 204b, switch arm 263, switch contact 264, contacts 211, 212, 213, and charges the three partial capacitances 221, 222, 223 fully. The flash bulb 208 is connected in parallel with the first capacitance 221. Associated with bulb 208, is a Tesla-ignition-winding 208' in series with contact 210'' and resistance 207 or with its own resistance.

Also switch 205 consists of two independent switches: 205a for daylight and diaphragm adjustment, and 205b for ignition in the flash circuit. Contact 205b, preferably as a so-called 'synchrocontact,' is attached to the shutter and actuated at about two thirds diaphragm opening of the lamina.

If, now, at exposure release by switch 205, switch 205b is also closed, then the three partial capacitances 221, 222, 223, switched-in and charged by the flash battery 207, are short-circuited (discharged) by the flash valve 208 over switch contacts 211–213, switch contact 264, arm 263, safety switch 24b and switch-in contactor 205b. This discharge is carried out at the same moment by the Tesla-ignition coil 208'.

In this way, the flash exposure with the required flash intensity is correctly effected.

The daylight exposure is prepared by closing the safety switch 204a and executed by closing the switch 205a. The latter, wither electrically or electronically, causes the opening of the shutter with a selected small delay in view of the ignition circuit for the flash, so that at the moment of shutter-opening the ignition of the flash is already in full progress.

EMBODIMENT 9

The solution according to FIG. 13 may be regarded as a pure electronic one. The diminishing of the flash intensity according to the position of the switch arm 63 or 263 is affected by shortening the flash duration electronically. The advantage of this solution is that it replaces expensive computer flash devices for automatic determination of light intensity, which devices have the added disadvantage that, for each exposure, the computer must be fed by hand with all actual data. Valve flash unit 208 with battery 206, flash resistance 207 and flash capacitor 226 are separated from the camera in circuit diagram part 220. This part 220 is electrically connected to the camera 201, for example, by a four-terminal plug connection 227''–230'' or 227'–230'.

In the camera 201 itself, there is again a daylight automatic 202 which adjusts the correct exposure time for the diaphragm opening given by the narrow distance adjustment of the objective and, for example, by electronic means, brings home the shutter in correct time. Camera battery 203 common for both automatic systems, safety switch 204a and switch-in 205a are used for this purpose. The switch parts not mentioned thus far, remain for the flash automatic.

By switching in the safety switch 204b (as in the above described embodiment of FIG. 12) over the plug contacts 227' and 227'' or 228' and 228'', the charging of flash capacitor 226 by flash battery 206, over flash resistance 207 is executed.

Electrically separated from the circuit, which serves for the charging and igniting of the flash bulb unit, a special circuit is provided in the camera which s fed by the camera battery and has only the purpose to prematurely finish the duration of the flash according to the light intensity or volume necessary for the actual exposure. This circuit runs from the camera battery 203 over switch-in 205c, *switch arm 263 (63), resistances from contact 233 over 232 and 231 through resistance 236 to camera condenser 237. But the charging can start at first, if switch-in 205c at exposure release is closed.*

Partial circuit over magnet winding 239 and transistor 238 is parallel to this circuit, and is interrupted after switching in switch 205c, because it is locked by transistor 238. First the current flow through winding 239 is released, after the charging of the camera capacitor 237 by the transistor. The charging time of the condenser 237 is given by the RC element formed by the inserted resistances between circuit points 231–235 plus resistance 236 and capacity of condenser 237. The time constant of this charging circuit, therefore, is determined by the position of switch arm 263 (63). The resistances between points 231–235 and resistance 236 have such values and are tuned in such manner that also in this case, the condition is fulfilled that a given position of switch arm 263 automatically determines a desired diminishing of flash intensity. In the present case, as explained, this is effected by diminishing the flash duration by a corresponding variation of the time constant of the charging circuit for the camera condenser 237.

When at exposure release by the contactor 205, switches 205b and 205c are also closed, then the following occurs:

By closing of contacts 205b, the charged flash condenser 226 is discharged into the flash valve 208 over plug contacts 230''-230', the closed contacts 241 (of circuit breaker 240), switch 205b, plug contacts 228'-228''. The ignition and flash current starts. By simultaneous closing of switch 205c, the circuit is closed for forming the timing constant and shortening the flash duration, which circuit is separately fed by the camera battery as described above. The current, after actuation of transistor 238, flowing through magnet winding 239, causes the attraction of the armature of circuit breaker 240 so that by opening of contacts 241, the flash circuit is abruptly interrupted. The charge remaining on condenser 226 is dissipated by a simultaneous shortcircuit of condenser 226 over switch 242 or insertion of a resistance W at 242.

When the exposure has been finished, then circuit breaker 240 returns to home position, which in this case may be effected by a small spring x.

A variation of this embodiment as described above, is as follows:

The graduation is not accomplished in the circuit for determining the time constant by changing the resistance members (231-235) by the switching arm 263 (63). Instead, five condensers with graduated capacities are provided in place of one. Of these condensers, a designated condenser with predetermined capacity is selected automatically by the switch arm 263 (63) without curved contact 264 and connected in series with the constant resistance 236. Thus, the R C member consists now of five interchangeable graduated condensers and only one resistance, in contrast to the diagram of FIG. 13.

EMBODIMENT 10

In the solution of FIG. 14, the flash is not based on electrical but on combustible flash bulbs. The regulation of the light intensity, in this case, is effected on the basis that, from a number of small flash bulb units, a certain number are selected automatically and ignited as corresponds to the position of switch arm 263 (63 of FIG. 4). The circuit diagram of FIG. 14 shows again two separated parts: camera 201 and flash unit 220. The electric connection of both parts is effected by a six-terminal plug connection 250'-255' and 250''-225''-. The known daylight automatic 202 is situated in camera 201. The function of camera battery 203, safety switch 204 and switch 205 has been described for previous embodiments. Instead of one battery 203 as shown, two may be used: one with low voltage for the daylight automatic and a second battery with higher voltage for the ignition of the combustion bulbs.

The switch arm 263 and its contact arm 264 have the same function as the corresponding parts of FIG. 12. The position of switch arm 263 is determined by the narrow distance adjustment of diaphragm adjusting ring 51.

The flash unit 220 consists of a flash bulb composed of five individual units, each consisting of a small reflector, in the focus of which the lamp is placed. A total reflector is arranged around the group of individual units. This total reflector protrudes beyond the small reflectors above and beneath, as well as at the outsides. In such a composed total of individual reflector units along the line of focus, a stripe 270 is drawn, to which the individual lamps are attached in spaced relation.

Their distance corresponds to the mutual focus distance of the small reflectors. Each lamp 280 has a contact 276 at both extremities. (Similar lamps are known). The arrangement is such that each lamp 271-275 engages an associated local contact element 277 on the side with its contact 276. The other contacts 276 of the lamps, over a through-passing -passing contact bar 250, remain continuously connected with one pole of the camera battery 203 used as ignition battery. In the embodiment illustrated, switch contact arch 264 bridges only the first three contacts 251, 252, 253, of the total number of contacts 251-255. Thereby, through narrow distance adjustment, three of the five flashlamps 251-255 are automatically prepared for ignition.

Before each exposure, the stripe 270 by known means, is drawn so far in arrow direction that five new bulbs are always available for ignition. If, as in the present example, three bulbs are needed for the exposure and are ignited, then after exposure the three used bulbs are withdrawn in arrow direction and three new bulbs simultaneously move one. In FIG. 14, the lamps or bulbs 280 are the available unused lamps, whereas 281 have already been used.

The strips 270 with lamps 280 in spiral form may be wound on a spool similar to a film in a camera.

The arrangement is such that the lamps, as described above, engage a catch element in the focus of the individual small reflectors, and the used lamps are wound on a take-up reel after each exposure, so that finally the spool of unused lamps 280 is idle and the take up reel has received all used lamps. In order to attain a reliable ignition, it is preferable to connect each condenser 291-297 in series with each lamp 271-275, and a common resistance 290 in series with contact bar 250.

The special advantage of this variation, according to FIG. 14, is the fact that the whole flash device is much lighter than an electric flash bulb device in view of its battery.

Common to the embodiments 8 and 9 (FIGS. 12 and 13) is the feature that electric flash bulb devices generally need considerable voltage. This often causes inconveniences or dangers, especially when high voltages are to be introduced into the camera.

In practice, it is more advantageous to provide high voltage leads or elements only in the separate flash device, and to apply to the camera only low voltage switch conductors fed by the camera battery.

Therefore, in the embodiment 9 (FIG. 13) the magnet winding 239 and switch 240 with contacts 241, 242 should be located within the flash light device 220, as well as both switches 204b and 205b of the flash light circuit, so that the whole high voltage circuit is limited to device 220. The operation of the switches 204b and 205b, then, is effected electromagnetically by a governing circuit, fed by the low voltage camera battery 203.

The effectiveness of this variation is the same as that of FIG. 13.

It would be possible to simplify the circuit of FIG. 13 by uniting the two circuits (battery circuit of the camera and flash light circuit) and to use the flash light circuit also to adjust the flash duration as mentioned above, but the separate circuits are preferred because of the only minor dangers.

In reducing the invention to practice, difficulties occur when the flash duration exceeds the diaphragm opening time. Between the moment of flash ignition and the moment of reaching the full light intensity, there exists a starting period which can be shortened considerably by preignition, for example, about 17 ms. Methods for performing such preignition are known per se, and can be used in the present case. Nevertheless, it must be prevented that a high daylight intensity, the daylight automatic adjusts exposure times which are shorter than the flash duration. This may be avoided by reducing the diaphragm opening in order to adjust larger exposure times by the daylight automatic. According to the invention, therefore, in the daylight automatic circuit there is an additional alarm circuit provided, which lights up a small warning lamp of special color (for example, yellow) in all cases in which the daylight automatic balances an exposure duration shorter than the flash duration of the flash lamps (shortened by preignition period). The user of the camera realizes from the illumination of the colored lamp that the diaphragm opening is too large and reduces the latter until the color disappears. This case generally will occur only when adjusting too large foreground distances, the diminution of which is unimportant for the total image.

The other remedy is to limit the maximum foreground distance adjustment by a stop device on the adjustment ring 51, automatically limiting thereby the maximum diaphragm opening.

EMBODIMENT 11

Figure 15:
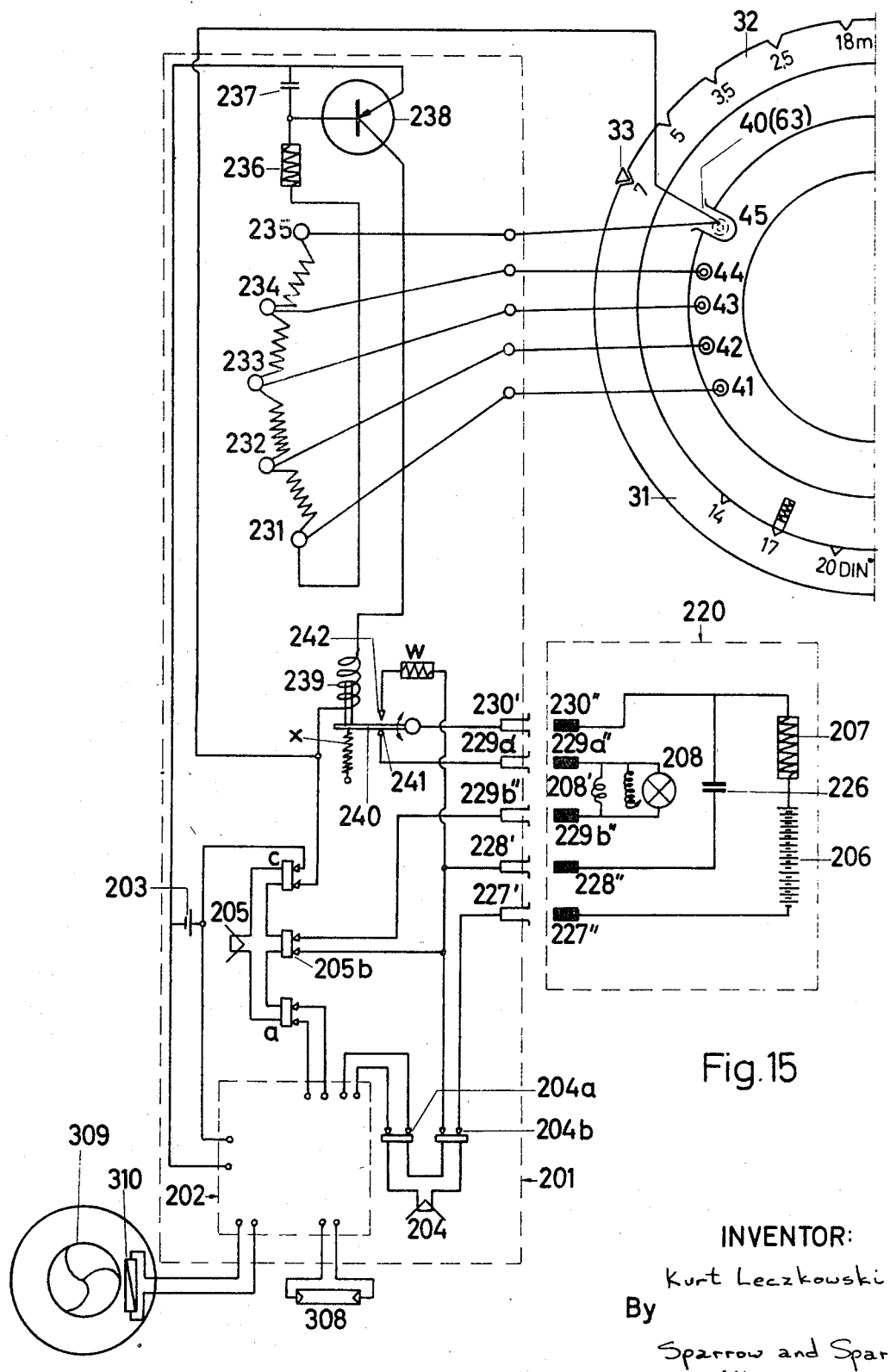
FIG. 15 shows an arrangement with electronic shutter control and electronic flash control.

FIG. 15 shows a further example with electronic shutter actuation and electronically adjusted flash-duration controlled by a switch arm simultaneously and automatically together with the foreground distance adjustment. This is a combination of the examples of FIG. 3 (camera with unvaried diaphragm aperture) with electronic shutter control by a daylight automatic and a flash light control according to FIG. 13; the control of the flash light duration (flash light volume) being set according to the adjusted foreground distance.

In FIG. 15 the diagram of the foreground adjustment (scale 32) and adjustment of the flash light intensities (41-45) according to the position of switch arm 40 (63) are drawn apart. The further electric diagram mainly corresponds to that of FIG. 13. A daylight automatic control device 202 (known per se) for electronic shutter, e.g., transistor battery 203, safety switch 204a and release switch 205a on the one hand, as well as for the photo resistance 308 and actuating magnet 310 for the electronic shutter 309 on the other hand, are shown. Furthermore, the connecting conductors between contacts 41-45 and resistance tab 321-235, and the conductors between the general connection diagram and switch arm 40 (FIG. 3) attached to the foreground distance adjusting ring, are represented.

In the flash light apparatus 220, the flash light lamp 208, positioned in the connection between contacts 205b and 241 and connected in parallel with condenser 226 at releasing, is again ignited by a "Tesla-winding" 208' through closing of releasing switch 205b. Interrupter 241 shortens the flash duration according to the time-constant of the electronic connection diagram, as in example 9 (FIG. 13) and given by the position of switch arm 40.

This most simple example for a fully electronic flash adjustment for cameras with unvaried diaphragm aperture and electronic shutter, can be perfected in stages:

a. by combination of the foreground adjusting arrangement for attaining large depth-sharpness for foreground distances, e.g., arrangement according to FIGS. 5-7 (for simple cameras without coupling both distance adjustments);

b. by adding an arrangement for variation of the diaphragm aperture, according to the scheme of FIG. 4 (instead of FIG. 3) wherein as a further improvement — represented in FIG. 4— upon reaching a predetermined narrow distance, the flash light illumination control with variation of the diaphragm aperture (for larger foreground distance), can be automatically replaced by a system with diminution of the flash light duration (for smaller foreground distances).

By these examples, therefore, the possibility of varied combinations of the actual embodiments shown in greater detail is explained. In this way, if needed, combinations may be made for cameras of the simplest kind. But in each of these cases, according to the invention, exposure controls may be obtained, by inexpensive electronic means, which are useful for all actual conditions: daylight, flash light and mixed light.

It will be understood that the time constant of elements 231–237, instead of changing the resistances, may be varied also by staggering the capacity of the condensers or by a combination of both methods.

What I claim is:

1. A method of automatic exposure control for taking exposures with mixed light, in a camera having daylight automatic control means for taking exposures under daylight conditions, and distance dependent flash automatic control means for taking exposures under flash conditions, said method comprising the steps of measuring the daylight intensity and setting exposure time and diaphragm aperture in dependence on each other, said settings of exposure time and diaphragm aperture being also dependent on said measured daylight intensity, manually adjusting the flash automatic control means by the amount of the distance between the camera and a foreground object to be additionally illuminated by a flash, and setting the flash intensity and diaphragm aperture in dependence on each other, said flash intensity and diaphragm being also dependent on said manually adjusted distance, said diaphragm aperture being identical in said setting steps.

2. A method according to claim 1 in a photographic camera with a changeable diaphragm aperture, including the step of setting a predetermined foreground distance from said camera manually and thereby setting, simultaneously and automatically by the flash automatic exposure control system and diaphragm to an aperture corresponding to the foreground distance adjustment of said camera for properly illuminated flash exposures.

3. A method as claimed in claim 2, in a camera with changeable diaphragm aperture, including the step of setting a predetermined foreground distance manually and thereby also setting by means of gearing,
   a. if said foreground distance is large, the diaphragm aperture corresponding to the foreground distance, while the flash output remains unchanged at its normal value,
   b. if the foreground distance is small, the flash output corresponding to the adjusted foreground distance while the diaphragm aperture remains unchanged at a value corresponding to the preset foreground distance,
   the transition from step (a) to step (b) and vice versa being performed automatically by said gearing when said preset foreground distance is passed through during said manual adjustment of the foreground distance.

4. A method according to claim 1 in a photographic camera with unchangeable diaphragm aperture, including as the first step the manual setting of a predetermined foreground distance from said camera and thereby setting, simultaneously and automatically, the flash intensity to a degree corresponding to the foreground distance adjustment of said camera for properly illuminated flash exposures.

5. An automatic exposure control arrangement in a photographic camera for taking exposures in combined day light and flash light comprising, in combination, a daylight automatic exposure control system in said camera for exposures under day light conditions, a flash automatic exposure control system for exposures under flash conditions, the means for manually setting on the camera a predetermined foreground distance for a foreground object to be illuminated by flash light and for actuating the flash light exposure control system simultaneously with the setting of the foreground distance whereby to establish a combination of flash light output and an aperture of a diaphragm means, said day light automatic exposure control system having brightness measuring means for measuring the prevailing day-light intensity and means for setting the exposure time as a function of said prevailing daylight intensity and the diaphragm aperture, said diaphragm aperture being a common factor of both, the day light automatic exposure control system and the flash automatic exposure control system.

6. An automatic exposure control arrangement according to claim 5 and including auxiliary foreground distance setting means for setting desired foreground distances independent of the focusing means for focusing the camera to take a sharp picture.

7. An automatic exposure control arrangement according to claim 6 and including releasable coupling means between said auxiliary distance setting means and said focusing means.

8. An automatic exposure control arrangement according to claim 7 and including safety switching means in the flash ignition circuit, said switching means being closed by actuation of said foreground distance setting means, and a locking device released by the shutter upon closure after an exposure.

9. An automatic exposure control arrangement according to claim 8 and including a focussing scale means for indicating the setting of correct focus, auxiliary distance scale means for indicating the setting of said predetermined foreground distance, and coupling means for coupling said focusing scale means to said auxiliary foreground scale means when their indications are identical, said scale means being marked at identical intervals.

10. An automatic exposure control arrangement according to claim 9 wherein said safety switching means in the flash ignition circuit is actuated by said coupling means for coupling said focussing distance scale means to said auxiliary foreground distance scale means.

11. An automatic exposure control arrangement according to claim 10 including stop means cooperating with said foreground setting means, for limiting the setting of said foreground setting means beyond a certain distance and thereby to limit the maximum size of the aperture of said diaphragm means to prevent too short exposure time, said diaphragm means being adjustable.

12. An automatic exposure control arrangement according to claim 11 including exposure time setting means set by said daylight automatic exposure control system as a function of the prevailing daylight intensity, said diaphragm aperture being set by said flash automatic control means, said diaphragm aperture being variable under the control of the flash light exposure control system automatically when the means for setting the foreground distance are manually actuated.

13. An automatic exposure control arrangement according to claim 12 including a first setting ring in said auxiliary diaphragm setting means, a second ring for setting the film speed and adjacent said first setting ring and rotatably displaceable in relation to the latter, said third setting ring being set with correction factors comprising flash light output and reflector effectiveness.

14. An automatic exposure control arrangement according to claim 13 including a linear foreground distance indicating scale, a non-linear diaphragm setting scale, and interconnecting means for interconnecting the markings on said linear foreground distance scale with the marking on said diaphragm setting scale.

15. An automatic exposure control arrangement according to claim 12 including foreground distance adjusting means and means for setting the diaphragm aperture and including light index coupling means between the foreground distance adjusting means and the setting of the diaphragm aperture, said diaphragm aperture being set as a function of the desired foreground distance.

16. An automatic exposure control arrangement according to claim 15 wherein the flash light exposure system sets the diaphragm means and the flash intensity depending on the set foreground distance.

17. An automatic exposure control according to claim 16 including means for limiting the closing of said diaphragm to below a predetermined opening, and reducing the flash output to compensate for said minimum predetermined opening for shorter foreground distances.

18. An automatic exposure control arrangement according to claim 16 including a manually actuated foreground distance adjusting ring for setting the diaphragm aperture for larger foreground distances, an auxiliary ring coupled with said foreground distance adjusting ring, a control arm attached to said auxiliary ring for controlling the flash output at smaller foreground distances, releasable locking means coupling said auxiliary ring with said diaphragm ring, said locking means being locked and released respectively when in both directions said foreground distance setting means pass though a predetermined foreground distance mark thereby switching from diaphragm aperture control to flash output control and vice versa, said locking means being thereupon released.

19. An automatic exposure control according to claim 5 including a lens with a fixed diaphragm aperture, the flash light automatic exposing control system setting the flash output in accordance with the set foreground distance automatically when the means for setting the foreground distance is manually actuated, the exposure time being set by said light automatic exposure control system as a function of the prevailing daylight intensity and said diaphragm aperture.

20. An automatic exposure control arrangement according to claim 19 including an auxiliary ring coupled with the foreground distance setting ring and, attached to said auxiliary ring, and a control arm for controlling the flash output in accordance with the adjusted foreground distance.

21. An automatic exposure control arrangement according to claim 5 including flash bulb means comprising a plurality of flash bulbs interconnected for ignition selectively, and switch arm means automatically positioned by said attached foreground distance setting means for selecting the number of flash bulbs to be ignited together simultaneously for taking an exposure.

22. An automatic exposure control arrangement according to claim 21 including strip-like means for mounting said plurality of flash bulbs thereon, conducting rail means along said supporting means and electrically connected by sliding to one terminal of each of said flash bulbs, and stationary contact means for contacting the other terminal of said flash bulbs for selectively igniting said flash bulbs, each of said flash bulbs being associated with an individual reflector cooperating with an elongated substantially larger overall reflector.

23. An automatic exposure control arrangement according to claim 22 and including reel means for storing said supporting means with unused flash bulbs to be fed into said overall reflector and other reel means for collecting the flash bulbs burnt during the exposures, and means for leading said supporting means with bulbs from one of said reel means through the foci of the reflectors to the other reel means.

24. An automatic exposure control arrangement according to claim 20 including electronic means in the flash automatic exposure control system for regulating the flash light output, and contact means set as a function of said predetermined foreground distance and actuating electronic means for reducing the flash output.

25. An automatic exposure control arrangement according to claim 24 including an electronic flash device comprising a plurality of electrical capacitors for firing the electronic flash bulb, said plurality of electric capacitors being connected in parallel, and switch arm means automatically positioned by said foreground distance setting means for selecting the number of capacitors to be discharged together for giving the desired flash intensity output.

26. An automatic exposure control arrangement according to claim 24 including means actuating the electronic means for reducing the flash intensity output by reducing the duration of the flash.

27. An automatic exposure control arrangement according to claim 26 including electric flash bulb means, capacitor means connected to said bulb means, resistance capacitance network means in said electronic means, switch arm means associated with said adjusting means and setting the time constant of said resistance-capacitance networks, magnetic interrupting means for interrupting the ignition circuit of said flash bulb means in accordance with the time constant, and transistor means connected to said magnetic interrupting means for actuating the same as a function of said time constant.

28. An automatic exposure control arrangement according to claim 27 including electronic means in the day light automatic exposure-control system for setting the shutter exposure time, the flash light intensity of the electrical flash bulb being automatically regulated by electronically decreasing the duration of the flash.

* * * * *